United States Patent

Stump et al.

[15] 3,649,301

[45] Mar. 14, 1972

[54] A PROCESS FOR PREPARING A SAUSAGE MEAT EMULSION

[72] Inventors: Harry C. Stump, Palatine; Paul L. Ford, Flossmoor, both of Ill.

[73] Assignee: Armour and Company, Chicago, Ill.

[22] Filed: Mar. 14, 1969

[21] Appl. No.: 807,421

[52] U.S. Cl. ........................................................... 99/109
[51] Int. Cl. ...................................................... A22c 11/00
[58] Field of Search ............... 99/107, 109, 7, 18; 260/412.6

[56] References Cited

UNITED STATES PATENTS

| | | | |
|---|---|---|---|
| 3,008,831 | 11/1961 | Christianson | 99/109 |
| 3,078,287 | 2/1963 | Downing | 99/109 X |
| 3,270,041 | 8/1966 | Artar et al. | 99/109 X |
| 3,295,982 | 1/1967 | Hickey et al. | 99/107 X |

*Primary Examiner*—Hyman Lord
*Attorney*—Carl C. Batz and Frank T. Barber

[57] ABSTRACT

A method for manufacturing sausage in which the broth produced in the high-temperature wet-rendering of animal fat is combined with raw meat materials to form a sausage emulsion.

7 Claims, No Drawings

A PROCESS FOR PREPARING A SAUSAGE MEAT EMULSION

BACKGROUND OF THE INVENTION

This invention relates to the manufacture of sausage products and especially to those sausage products which are made from a meat emulsion such as frankfurters, bologna and the like.

A meat emulsion for sausage generally consists of a protein and water phase (the continuous phase) and a fat phase (the discontinuous phase). It is believed that the protein and water of the meat form a matrix that encapsulates the fat protein. As is true with other emulsions, a meat emulsion may become unstable and break down. Temperature is a significant factor in this regard, and temperatures in excess of 70° F. while preparing the emulsion are generally not acceptable.

The moisture or water in a meat emulsion may be derived wholly or in part from the meat ingredients themselves, however, many products would be dry and unpalatable if the moisture content were limited to the natural moisture of the meat. It is therefore common practice in the industry to add additional moisture to sausage emulsion products. The amount of moisture which can be added is limited by the stability characteristics of the emulsion itself, and is also limited by U.S. Government standards. For example, current regulations prescribe that the moisture content in final cooked frankfurters may not exceed four times the protein content plus 10 percent.

Thus it can be seen that the problem posed to the sausage industry involved the proper balance of the aforementioned requirements; that is, to provide for the addition of the correct amount of moisture while controlling the temperature of the emulsion, and at the same maintaining the appropriate ratio of protein content to moisture content. The technique most widely, if not universally, used in the industry to satisfy these requirements is to select meat raw materials of sufficiently high protein levels and to add the moisture in the form of ice. Thus the ice performs the dual function of moisture addition and temperature control.

Although the foregoing procedure has been widely accepted, it has limitations which are alleviated or eliminated in the method of the present invention. Perhaps the most significant limitation of the aforementioned procedure is the difficulty of increasing moisture content while maintaining an acceptable moisture to protein ratio. As ice or water, which contains no protein, is added, the moisture content increases but the moisture to protein ratio also increases. To reestablish the required moisture to protein ratio, protein must be added. However, in a sausage emulsion the available protein source is the meat raw material which is a solid material. Therefore although the addition of solid meat material will decrease the moisture to protein ratio, it will also decrease the total moisture percentage. The present invention provides a solution to this multifaceted problem.

SUMMARY OF THE INVENTION

We have discovered that the moisture content and the moisture to protein ratio of sausage can be more readily controlled in a method of sausage manufacture, and it is an object of the present invention to facilitate the control of the aforementioned elements.

It is a further object of the present invention to provide a method of sausage preparation in which the protein content of the sausage can be increased without increasing the proportion of meat raw materials.

In the method of the present invention, the broth from high temperature wet rendering of animal fat is collected and rapidly cooled to less than 100° F. The solid meat and fat raw materials are collected and chopped. The broth temperature may be adjusted as necessary and the broth added to the meat and fat solids which are then chopped to form a meat emulsion. The finished emulsion may be stuffed into sausage casings.

DESCRIPTION OF PREFERRED EMBODIMENTS

In the preferred embodiments, broth is collected from the high-temperature wet-rendering of animal fat, particularly beef or pork fat. In this type of rendering, the fat material is placed into tanks or kettles into which live steam is usually introduced. The heat from the steam causes the fat to be rendered or cooked out, the fat being separated for use as lard in the case of pork fat, or as edible tallow in the case of beef fat. As the heat is transferred from the steam, it condenses out to form a tank broth containing dissolved protein.

The rendering process may be carried out in a wide range of temperatures and pressures which vary with the particular installation or technique. In general, high-temperature wet-rendering includes temperatures of about 185° F. to 325° F. and corresponding pressures of 15 to 60 p.s.i. The animal fat should be rendered in the presence of moisture at a temperature of at least 200° F., and preferably at a temperature of about 250–325° F., and at a pressure of 40–60 p.s.i. Pork fat is preferably rendered in the presence of steam at a temperature in excess of 220° F.

While the foregoing generally describes high-temperature wet-rendering techniques as they are presently practiced, it will be understood that the invention is not limited to a broth produced by that specific method. Rather the invention includes an equivalent broth which may be produced by the high-temperature rendering of fat in the presence of moisture wherein the moisture does not function as the heat source as it does in the case of steam. That is, the broth may be produced in a process wherein added moisture and fat are heated together by an external source of heat.

The condensate broth from the wet-rendering contains significant amounts of useful protein. In the case of broth from beef fat rendering, the protein content was found to be about 4–5 percent. In the case of broth from pork fat rendering, the protein content was found to be about 10–14 percent. While we have found that the broth from either beef or pork fat rendering can be used in the present process, it is preferred to use the pork fat broth because of its higher protein content.

When the broth is recovered from the wet-rendering process, it is quite hot, generally in the range of about 190° F.–220 F. We have discovered that the broth must be rapidly cooled to 100° F. or lower in order to be used in the practice of the present method. The broth temperature should be lowered to about 100° F. or less within 3 to 4 hours after it is recovered from the rendering tanks. Preferably the broth is cooled to 100° F. or below within 1—1½ hours after removal from the tanks. It will be understood that the broth may be chilled even more rapidly if necessary chilling equipment is available. The broth may be rapidly chilled to a temperature of at least 40° F.

The broth may be placed in a blast freezer at about −5 to −10° F., stirring at intervals, preferably until the broth temperature is about 60° F. It will be understood however that any means of rapid cooling may be used such as a heat exchanger, plate freezer or the like. If desired the broth may be cooled further by continued blast freezing, or subjected to normal refrigeration after the initial cooling. For example, when fresh, unfrozen meat and fat ingredients are used, we prefer to use a broth temperature in the range of 30°–60° F., and particularly in the range of 30°–36° F.

In a preferred embodiment of the present method, raw meat and fat materials are initially ground or chopped and mixed. The raw materials used can be any meat or fat item commonly used in sausage meat emulsions including:

Picnic Trimmings
Boneless Beef Plates
Beef Cheeks
Skinless Bellies
Jowls
Boneless Chucks
Boneless Flanks
Boneless Butts
Boneless Hams
Boneless Loins It will be understood that the above-mentioned items are illustrative only and that other meat or fat items can be used, including poultry pieces.

The meat and fat materials may be placed into a chopper and the chilled broth added. Any desired spices and cures may also be added at this time. The chopping of the ingredients is continued, adding broth as necessary, until a stable meat emulsion is produced. Ice may also be added during the chopping process in order to maintain the temperature of the emulsion within desired limits. Generally, an emulsion temperature of 40°–70° F., is preferred. The amount of ice, if any, which may be added depends upon the initial temperature of the chilled broth, the temperature of the meat and fat ingredients, and the heat generated in the chopping step.

The meat emulsion can be stuffed into various casings for frankfurters, bologna, and the like. After ordinary cooking, the finished product has excellent flavor, color and texture. Moreover, the product produced by the present methods has an increased protein content of about 1–2 percent compared to similar product prepared from equal ingredients but without the broth. The moisture to protein ratios of the products prepared by the present method were well within acceptable ranges, and lower than that found in similar products prepared without the broth.

Broth may be added in proportions compatible with the end product desired, the moisture to protein ratio desired, the percent protein desired and the like. In the manufacture of frankfurters, for example, we prefer to use the broth in a proportion of about 10 lbs. to about 40 lbs. per 100 lbs. of meat and fat solid ingredients. Excellent results have been obtained using a proportion of 20 lbs. of broth per 100 lbs. of meat and fat solid ingredients.

Other preferred embodiments of the present invention can be understood with reference to the following illustrative examples:

EXAMPLE I

A control sample was prepared, without the use of broth as called for in the present process, in order to establish a comparison of finished product. The control was prepared as follows:

Meat and fat ingredients were prepared by grinding and blending lean picnic trimmings, boneless beef plates, beef cheek meat, skinless pork bellies and beef deckles. Four-hundred and fifty pounds (450 lbs.) of the ground and blended raw material was placed into a Boss Silent Cutter to which was added 75 lbs. of ice and salt, spices and cures. The mixture was chopped to 40° F. and 25 lbs. of rework frankfurters was added. Twenty-one pounds (21 lbs.) of cold water was added slowly and the mixture chopped to 58° F. Thirty pounds (30) of ice was chopped in and the meat emulsion was transferred to a Griffith Mince Master and the final emulsification was carried out. The emulsion was stuffed into casings and cooked.

The emulsion was stable and the final product had good color, flavor, texture and peelability. An analysis disclosed that the product contained 50.0 percent moisture and 10.9 percent protein, for a moisture to protein ratio of 4.59 to 1.

EXAMPLE II

Fresh pork fat was placed into lard rendering tanks and rendered with steam from 280° F.–300° F. at 50–60 p.s.i. for about 2½ hours. The resulting broth was drawn off and placed in a blast chiller at about −8° F. The broth was stirred at about 15-minute intervals until the temperature reached 60° F. At this point the stirring was stopped and the broth temperature lowered to 30° F. The broth was found to contain about 12.5 percent protein.

Four-hundred and fifty pounds (450 lbs.) of the ground and blended raw material prepared as in Example I were placed into a Boss Silent Cutter to which was added 53 lbs. of ice, 40 lbs. of broth, and salt, spices and cures. The mixture was chopped to 40° F. and 25 lbs. of rework frankfurters was added. Thirty pounds (30 lbs.) of broth was added slowly and the mixture chopped to 60° F. Twenty (20) pounds of ice and 20 pounds of broth was then added and chopped in. The meat emulsion was transferred to a Griffith Mince Master and the final emulsification was carried out. The emulsion was stuffed into casings and cooked in the usual manner.

The product was found to have good color, flavor, texture and peelability. The product was analyzed and found to have a 51.4 percent moisture content and a 12.0 percent protein content for a moisture to protein ratio of 4.28 to 1.

EXAMPLE III

Four-hundred and fifty pounds (450 lbs.) of meat and fat raw materials prepared as in Example I were placed in a Boss Silent Cutter with 36 lbs. of ice and 50 lbs. of broth prepared as in Example II. Salt, spices and cures were added and the mixture was chopped to 40° F. Twenty-five pounds (25 lbs.) of rework frankfurters was added and the mixture chopped to 56° F. Forty pounds (40 lbs.) of broth was added and mixed in. The emulsion was transferred to a Griffith Mince Master and emulsification was completed.

The emulsion, which was not quite as stable as the control, was stuffed into casings and cooked. The product was of satisfactory flavor and texture and contained 49.2 percent moisture and 12.4 percent protein. The moisture to protein ratio was 3.97 to 1.

EXAMPLE IV

A control sample was prepared without the use of broth as called for in the present process. Lean picnic trimmings, beef plates, beef cheek meat, skinless pork bellies and pork jowls were ground and blended to form meat and fat raw material. Four-hundred and fifty pounds (450 lbs.) of the raw material was placed in a Boss Silent Cutter with 75 lbs. of ice and chopped to 40° F. Salt, spices and cures were added during the chopping step. Twenty-five pounds (25 lbs.) of rework frankfurters was added and 21 lbs. of cold water was slowly added and the mixture chopped to 58° F. Thirty pounds (30 lbs.) of ice was added and chopped in. The emulsion was transferred to a Griffith Mince Master and final emulsification was carried out.

The emulsion was of good stability and the finished stuffed and cooked product had good flavor and texture. The moisture content was 51.75 percent and the protein content was 10.9 percent. The moisture to protein ratio was 4.75 to 1.

EXAMPLE V

Fresh beef fat was placed into rendering tanks and steam rendered as in Example II. The resulting broth was drawn off and put in a blast chiller at −7° F. The broth was stirred as it chilled to 60° F. and then chilled to about 32° F. An analysis of the broth indicated a protein content of about 4.85 percent.

Meat and fat raw materials prepared as in Example IV was placed in a Boss Silent Cutter along with ice, broth, salt, spices and cures. Four-hundred and fifty pounds (450 lbs.) of meat raw material, 36 lbs. of ice and 50 lbs. of beef fat broth were used. The mixture was chopped to 40° F., 25 lbs. of rework frankfurters were added, and the mixture was chopped to 56° F. Forty pounds (40 lbs.) of broth was added and chopped in. The emulsion was then transferred to a Griffith Mince Master and the emulsification was completed. The emulsion was stable and the finished cooked product had good color, texture and peelability. The moisture to protein content was 4.66 to 1. The moisture content was 52.2 percent and the protein content was 11.2 percent.

As can be seen in the foregoing examples the product prepared with the broths had a moisture to protein ratio which was lower than the control samples even though the products prepared with the broths had a higher moisture content than the control samples, except for the product of Example III. However, even though the moisture content of the product in Example III was somewhat lower than the control, the moisture to protein ratio was also very low.

While in the foregoing specification the method of the present invention has been set forth in considerable detail, it will be understood that the method can be varied widely by those skilled in the art without departing from the scope of the invention which is defined in the appended claims.

We claim:

1. A process for preparing a sausage meat emulsion comprising the steps of rendering animal fat in the presence of moisture at temperatures of about 185°–325° F. whereby a water and dissolved protein broth is formed during said rendering, recovering and rapidly chilling said broth within about 4 hours to a temperature less than 100° F., and mixing said broth and ground meat in a proportion of about 10–40 pounds of broth per 100 pounds of said meat while maintaining the temperature of the mixture at a chilling temperature to form a meat emulsion.

2. The process of claim 1 in which said moisture is introduced as steam.

3. The process of claim 1 in which said broth is chilled to a temperature of about 30°–36° F.

4. The process of claim 1 in which said broth is added in the proportion of about 20 pounds of broth per 100 pounds of said meat.

5. The process of claim 1 in which the temperature of said ground meat and broth mixture is maintained at about 40°–70° F. to form a meat emulsion.

6. The process of claim 1 in which said animal fat is pork fat.

7. The process of claim 1 in which said meat emulsion is stuffed into a casing to form a sausage.

* * * * *